United States Patent
Fujino (10) Patent No.: US 9,970,398 B2
(45) Date of Patent: May 15, 2018

(54) FUEL INJECTION DEVICE

(71) Applicant: DENSO CORPORATION, Kariya, Aichi-pref. (JP)

(72) Inventor: Tomoki Fujino, Kariya (JP)

(73) Assignee: DENSO CORPORATION, Kariya (JP)

( * ) Notice: Subject to any disclaimer, the term of this patent is extended or adjusted under 35 U.S.C. 154(b) by 42 days.

(21) Appl. No.: 15/119,455

(22) PCT Filed: Feb. 24, 2015

(86) PCT No.: PCT/JP2015/000913
§ 371 (c)(1),
(2) Date: Aug. 17, 2016

(87) PCT Pub. No.: WO2015/136862
PCT Pub. Date: Sep. 17, 2015

(65) Prior Publication Data
US 2017/0016417 A1    Jan. 19, 2017

(30) Foreign Application Priority Data

Mar. 14, 2014  (JP) ................................ 2014-051292

(51) Int. Cl.
*F16K 31/06* (2006.01)
*F02M 51/06* (2006.01)
(Continued)

(52) U.S. Cl.
CPC ...... *F02M 51/0685* (2013.01); *F02M 21/026* (2013.01); *F16K 31/0655* (2013.01);
(Continued)

(58) Field of Classification Search
CPC ............. F16K 31/0651; F16K 31/0655; F16K 31/0686; F16K 31/0693; F16K 31/0696; F02M 51/0685
See application file for complete search history.

(56) References Cited

U.S. PATENT DOCUMENTS 5,088,467 A * 2/1992 Mesenich .......... F02M 51/0625
123/531
6,857,584 B2 * 2/2005 Sebastian ........... F02M 51/0653
239/533.2
(Continued)

FOREIGN PATENT DOCUMENTS

JP    H03-41279    2/1991
JP    2011-69331   4/2011
(Continued)

*Primary Examiner* — Matthew W Jellett
(74) *Attorney, Agent, or Firm* — Nixon & Vanderhye PC (57) ABSTRACT

A fuel injection device includes a coil, a stator provided on an inner side of the coil, a housing including an injection hole at an end opposite to a stator side in an axial direction, a movable element including a movable element main body that generates a first gap with the stator and a stopper portion provided to an injection hole side of the movable element main body, and provided inside the housing in a reciprocable manner, a main valve including a lock portion that generates a second gap smaller than the first gap together with an end face of the stopper portion on the stator side, and provided to open and close the injection hole, a first pushing portion constantly pushing the movable element to the injection hole side, and a second pushing portion constantly pushing the main valve to the stator side.

5 Claims, 8 Drawing Sheets

(51) Int. Cl.
  *F02M 21/02*  (2006.01)
  *F02M 61/18*  (2006.01)
  *F02M 61/20*  (2006.01)

(52) U.S. Cl.
  CPC ........... *F02M 61/184* (2013.01); *F02M 61/20* (2013.01); *Y02T 10/32* (2013.01)

(56) References Cited

U.S. PATENT DOCUMENTS

| | | | | |
|---|---|---|---|---|
| 8,528,842 | B2* | 9/2013 | Hoang | F02M 51/0685 |
| | | | | 123/472 |
| 9,664,161 | B2* | 5/2017 | Izzo | F02M 51/0685 |
| 9,765,738 | B2* | 9/2017 | Izzo | F02M 51/061 |
| 2005/0173979 | A1* | 8/2005 | Voss | B60T 8/363 |
| | | | | 303/119.2 |
| 2008/0277505 | A1* | 11/2008 | Hoang | F02M 51/0685 |
| | | | | 239/585.5 |
| 2012/0318883 | A1* | 12/2012 | Kusakabe | F02D 41/20 |
| | | | | 239/1 |
| 2014/0224903 | A1* | 8/2014 | Fujino | F02M 51/0664 |
| | | | | 239/585.1 |
| 2016/0293311 | A1* | 10/2016 | Cerny | F02M 51/0685 |

FOREIGN PATENT DOCUMENTS

JP  2013-253481  12/2013
WO  WO 2013060717 A1 *  5/2013  ......... F02M 51/0685

* cited by examiner

FUEL INJECTION DEVICE

CROSS REFERENCE TO RELATED APPLICATION

This application is the U.S. national phase of International Application No. PCT/JP2015/000913 filed on Feb. 24, 2015 which designated the U.S. and claims priority to Japanese Patent Application No. 2014-51292 filed on Mar. 14, 2014, the entire contents of each of which are incorporated herein by reference.

TECHNICAL FIELD

The present disclosure relates to a fuel injection device.

BACKGROUND ART

A fuel injection device in the related art supplies an internal combustion engine with gaseous fuel or liquid fuel by injection.

A fuel injection device described in Patent Literature 1 includes a movable element on a stator side of a main valve that opens and closes an injection hole. The fuel injection device is configured to perform pilot injection when a coil is energized by magnetically attracting the movable element to the stator side and thereby opening an auxiliary flow channel provided at a center of the main valve. The main valve moves to the stator side when a sum of a pressure acting on an end face of the main valve on an injection hole side and a pushing force of a spring constantly pushing the main valve to the stator side becomes larger than a fuel pressure acting on an end face of the main valve on the stator side due to the pilot injection. Owing to the configuration as above, the fuel injection device increases a lift amount of the main valve from the injection hole.

In the fuel injection device described in Patent Literature 1, however, a fuel pressure in a housing is decreased by the pilot injection before the main valve is lifted from the injection hole and such a decrease in fuel pressure causes an energy loss of fuel injection. Hence, fuel consumption may possibly be deteriorated.

Also, in the fuel injection device, a rate of increase in injection amount with an energization time differs when the pilot injection is performed and when the main valve is opened. Accordingly, a changing point is generated in a rate of increase in injection amount when an operation is switched from the pilot injection to the opening of the main valve and it may become difficult to control fuel injection.

Further, the fuel injection device includes a spring provided on an outer radius side of the main valve. Hence, because fuel passes through clearances of a coiled wire of the spring when the main valve is opened, the spring vibrates and may possibly break.

PRIOR ART LITERATURES

Patent Literature

Patent Literature 1: JPH03-41279A

SUMMARY OF INVENTION

In view of the problem discussed above, the present disclosure has an object to provide a fuel injection device capable of increasing an amount of fuel injection without causing an energy loss.

According to an aspect of the present disclosure, the fuel injection device includes a coil generating a magnetic field when energized, a stator provided on an inner side of the coil, a housing shaped like a cylinder and including an injection hole at an end opposite to a stator side in an axial direction, a movable element including a movable element main body that generates a first gap with the stator and a stopper portion provided to an injection hole side of the movable element main body, and provided inside the housing in a reciprocable manner, a main valve including a lock portion that generates a second gap smaller than the first gap together with an end face of the stopper portion on the stator side, and provided to the injection hole side of the movable element main body so as to open and close the injection hole, a first pushing portion constantly pushing the movable element to the injection hole side, and a second pushing portion constantly pushing the main valve to the stator side.

When the coil is energized, the movable element alone is magnetically attracted to the stator side by cancelling pushing forces of the first pushing portion and the second pushing portion until the stopper portion is in contact with the lock portion. When the stopper portion is in contact with the lock portion, the movable element and the main valve are magnetically attracted together to the stator side, and the injection hole is opened. When a fuel is injected from the injection hole, a pressure acting on a surface of the main valve on the injection hole side and a pressure acting on a surface of the main valve on the stator side are substantially balanced with each other, and the main valve moves to the stator side due to the pushing force of the second pushing portion. The fuel injection device can lift up the main valve with a larger amount.

The fuel injection device magnetically attracts the movable element alone to the stator side immediately after an energization of the coil is started, and moves the movable element and the main valve together to the stator side when a magnetic attraction force increases while the movable element comes closer to the stator. Therefore, the fuel injection device can increase the first gap between the stator and the movable element. The first gap is equivalent to a lift amount of the main valve. Thus, the fuel injection device can increase the lift amount of the main valve without causing an energy loss due to a pilot injection or the like. Further, since the fuel injection device does not perform the pilot injection, the fuel injection device can increase a fuel injection amount substantially linearly with an energization time.

BRIEF DESCRIPTION OF DRAWINGS

The above and other objects, features and advantages of the present disclosure will become more apparent from the following detailed description made with reference to the accompanying drawings. In the drawings.

DESCRIPTION OF EMBODIMENTS

Embodiments of the present disclosure will be described hereafter referring to drawings. In the embodiments, a part that corresponds to a matter described in a preceding embodiment may be assigned with the same reference numeral, and redundant explanation for the part may be omitted.

First Embodiment

A first embodiment of the present disclosure is shown in FIG. 1 through FIG. 5. A fuel injection device 1 of the first embodiment is installed to an internal combustion engine and injects gaseous fuel represented by a CNG (Compressed Natural Gas), an LNG (Liquefied Natural Gas), or hydrogen into a combustion chamber.

Figure 1:
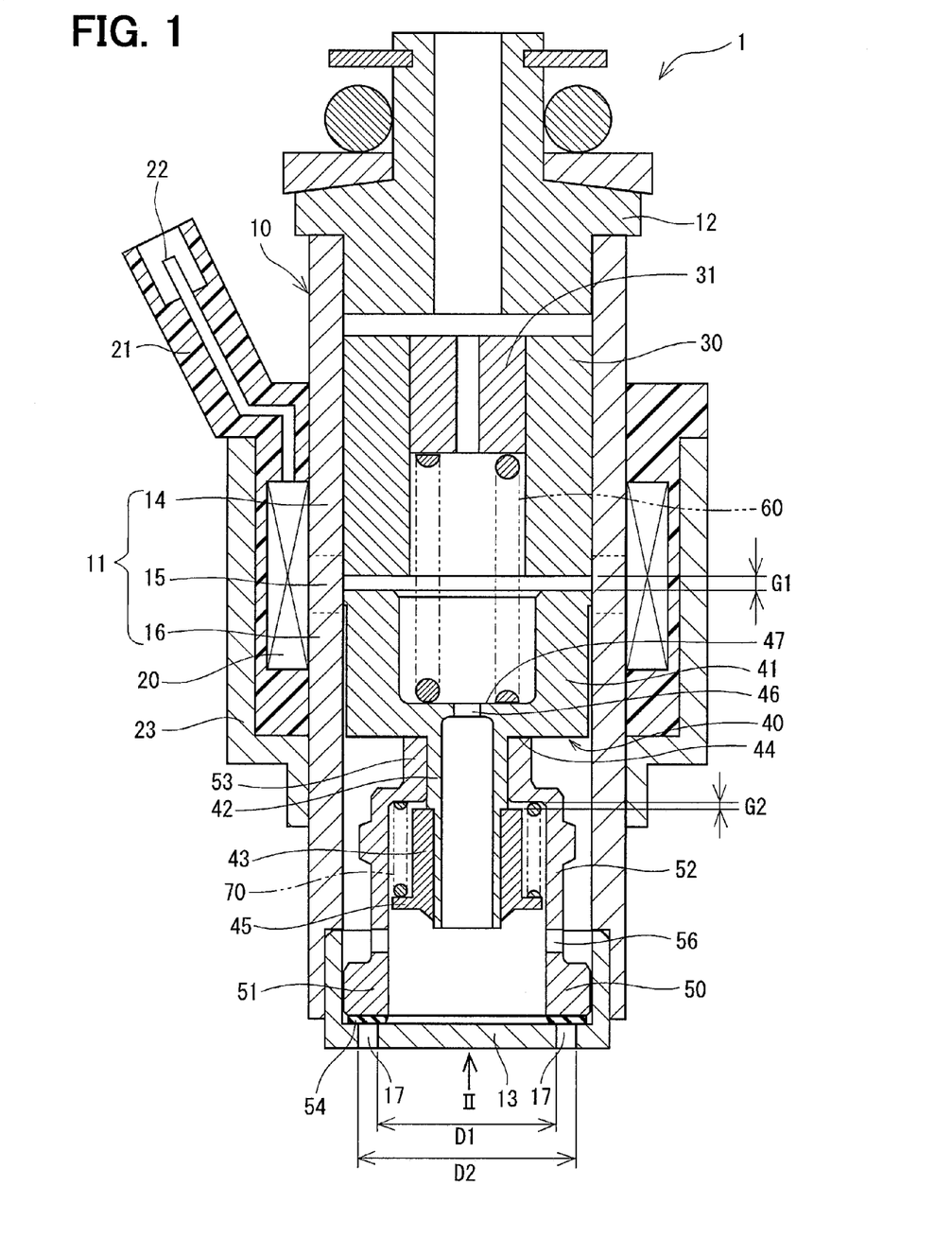
FIG. 1 is a sectional view of a fuel injection device according to a first embodiment of the present disclosure.

As is shown in FIG. 1, the fuel injection device 1 includes a housing 10, a coil 20, a stator 30, a movable element 40, a main valve 50, a first spring 60 as a first pushing portion, a second spring 70 as a second pushing portion, and so on.

The housing 10 has a tube portion 11 shaped like a cylinder, an inlet member 12 provided to the tube portion 11 at a first end in an axial direction, and an injection-hole member 13 provided to the tube portion 11 at a second end in the axial direction. The tube portion 11 has a first magnetic portion 14, a non-magnetic portion 15, and a second magnetic portion 16 disposed sequentially from an inlet member side to an injection-hole member side. The first magnetic portion 14 and the second magnetic portion 16 are made of, for example, ferritic stainless steel. The non-magnetic portion 15 is made of, for example, austenitic stainless steel. The non-magnetic portion 15 prevents a short circuit of a magnetic flux between the first magnetic portion 14 and the second magnetic portion 16.

In FIG. 1, boundaries of the first magnetic portion 14, the non-magnetic portion 15, and the second magnetic portion 16 are indicated by a broken line. It should be appreciated, however, that the three portions are bonded integrally by laser welding or the like.

The inlet member 12 is fixed on an inner radius side of the first magnetic portion 14. Fuel is supplied into the housing 10 from the inlet member 12.

Figure 2:
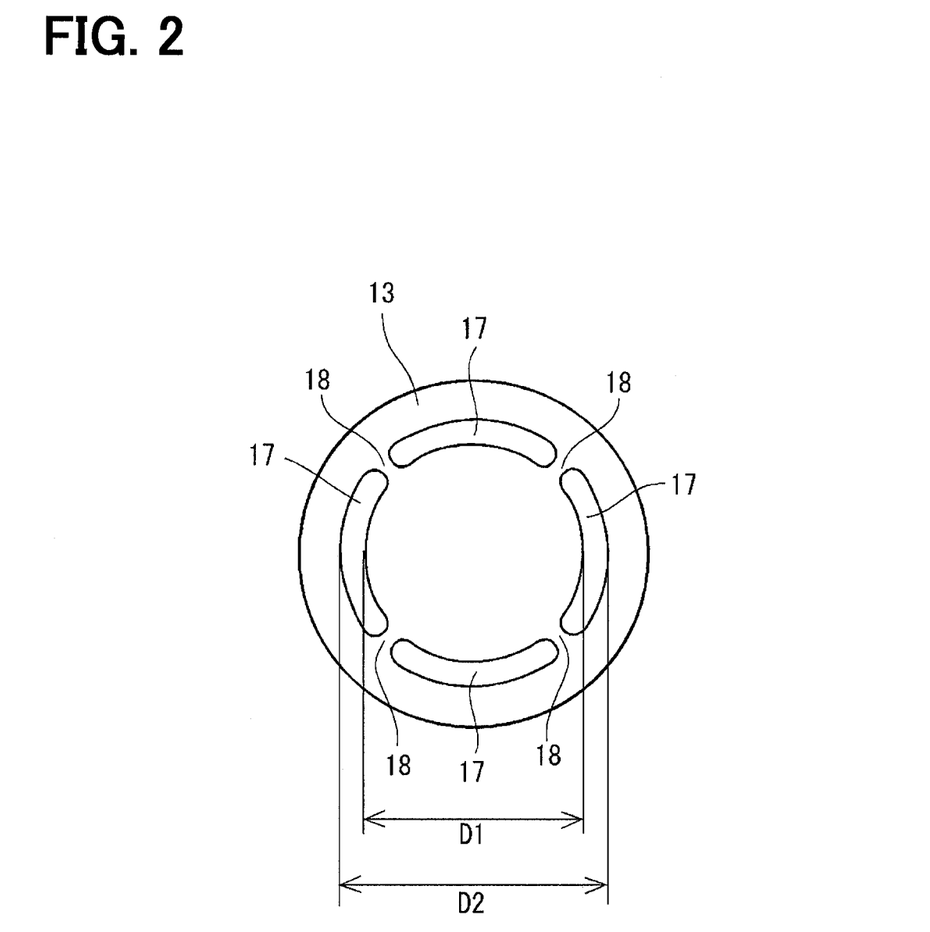
FIG. 2 is a view of the fuel injection device when viewed in a direction II of FIG. 1.

The injection-hole member 13 is made of, for example, martensite stainless steel. The injection-hole member 13 is shaped like a bottomed-cylinder and fixed on an inner radius side of the second magnetic portion 16. As is shown in FIG. 2, the injection-hole member 13 has an injection hole 17 of substantially a ring shape. The injection-hole member 13 has connection portions 18 connecting a portion on an inner radius side and a portion on an outer radius side of the injection hole 17.

As is shown in FIG. 1, the coil 20 formed by winding a wire around an unillustrated bobbin is attached on an outer radius side of the housing 10. A terminal 22 of a connector 21 and the coil 20 are electrically connected. A yoke 23 is made of a magnetic material, for example, ferritic stainless steel. The yoke 23 is shaped like a cylindrical cylinder and fixed on an outer radius side of the coil 20 and the housing 10.

The stator 30 is made of a magnetic material, for example, ferritic stainless steel. The stator 30 is shaped like a cylindrical cylinder and fixed to inner walls of the first magnetic portion 14 and the non-magnetic portion 15. An adjusting pipe 31 is press-fit and fixed inside the stator 30.

The movable element 40 is made of a magnetic material, for example, ferritic stainless steel and installed inside the housing 10 in a reciprocable manner. The movable element 40 has a movable element main body 41 allowed to make contact with the stator 30, a shaft portion 42 extending from the movable element main body 41 to the injection hole side, and a stopper portion 43 fixed on an outer radius side of the shaft portion 42.

An outer diameter of the shaft portion 42 is smaller than an outer diameter of the movable element main body 41. Hence, a step 44 is provided between the movable element main body 41 and the shaft portion 42. An end face of a lock portion 53 on the stator side is allowed to make contact with the step 44.

The stopper portion 43 has a spring receiver portion 45 shaped like a ring extending radially outward from an end on the injection hole side.

The movable element 40 has a hole 46 to let fuel pass through at centers of the movable element main body 41 and the shaft portion 42. It should be noted that fuel is also allowed to flow a space between an outer wall of the movable element main body 41 on the outer radius side and an inner wall of the housing 10.

A recess portion 47 is provided to the movable element main body 41 and the first spring 60 is provided between a bottom of the recess portion 47 and the adjusting pipe 31 fixed to the stator 30. The first spring 60 constantly pushes the movable element 40 to the injection hole side. Hence, a first gap G1 is generated between the stator 30 and the movable main body 41 when the coil 20 is de-energized. A pushing force of the first spring 60 is adjustable with a press-fit amount of the adjusting pipe 31.

The main valve 50 is made of a non-magnetic material, for example, martensite stainless steel. The main valve 50 is disposed on the injection-hole side of the movable element 40 and is also provided inside the housing 10 in a reciprocable manner. The main valve 50 has a valve main body portion 51 that opens and closes the injection hole 17, an arm portion 52 extending from the valve main body portion 51 to the stator side by passing the outer radius side of the stopper portion 43, and the lock portion 53 connected to an inner radius side of the arm portion 52.

The valve main body portion 51 has a sheet member 54 on the injection hole side. The sheet member 54 is made of, for example, fluorine-based rubber having excellent low-temperature resistance and oil resistance, and is allowed to make contact with an opening of the injection hole 17. The configuration as above enables the valve main body portion 51 to stop and start injection of gaseous fuel from the injection hole 17.

The arm portion 52 is provided on an outer radius side of the stopper portion 43 and shaped like a cylinder extending in an axial direction. The arm portion 52 has a fuel hole 56 opening in a plate thickness direction.

The lock portion 53 extends radially inward from an end of the arm portion 52 on the stator side like a ring and further extends to the stator side like a cylinder. An inner wall of the lock portion 53 on the inner radius side comes into sliding contact with an outer wall of the shaft portion 42 of the movable element 40. The movable element 40 and the main valve 50 are therefore disposed coaxially.

The second spring 70 is provided between the stopper portion 43 and the arm portion 52. A first end of the second spring 70 is locked by the spring receiving portion 45 provided to the stopper portion 43 and a second end is locked by the lock portion 53. The second spring 70 constantly pushes the main valve 50 to the stator side with respect to the stopper portion 43. Hence, a second gap G2 is generated between an end face of the stopper portion 43 on the stator side and the lock portion 53 when the coil 20 is de-energized. The second gap G2 is smaller than the first gap G1. Herein, let α be the first gap G1 and β be the second gap G2. In the state described as above, the step 44 of the movable element 40 and the end face of the lock portion 53 on the stator side are in contact with each other.

An operation of the fuel injection device 1 will now be described.

As is shown in FIG. 1, when an energization of the coil 20 is stopped, the movable element 40 is pushed to the injection hole side by a pushing force of the first spring 60, and because the lock portion 53 of the main valve 50 is in contact with the step 44 of the movable element 40, the main valve 50 is also pushed to the injection hole side. The main valve 50 therefore closes the injection hole 17 with the sheet member 54. Hence, fuel flowing into the housing 10 from the inlet member 12 is not injected from the injection hole 17.

Figure 3:
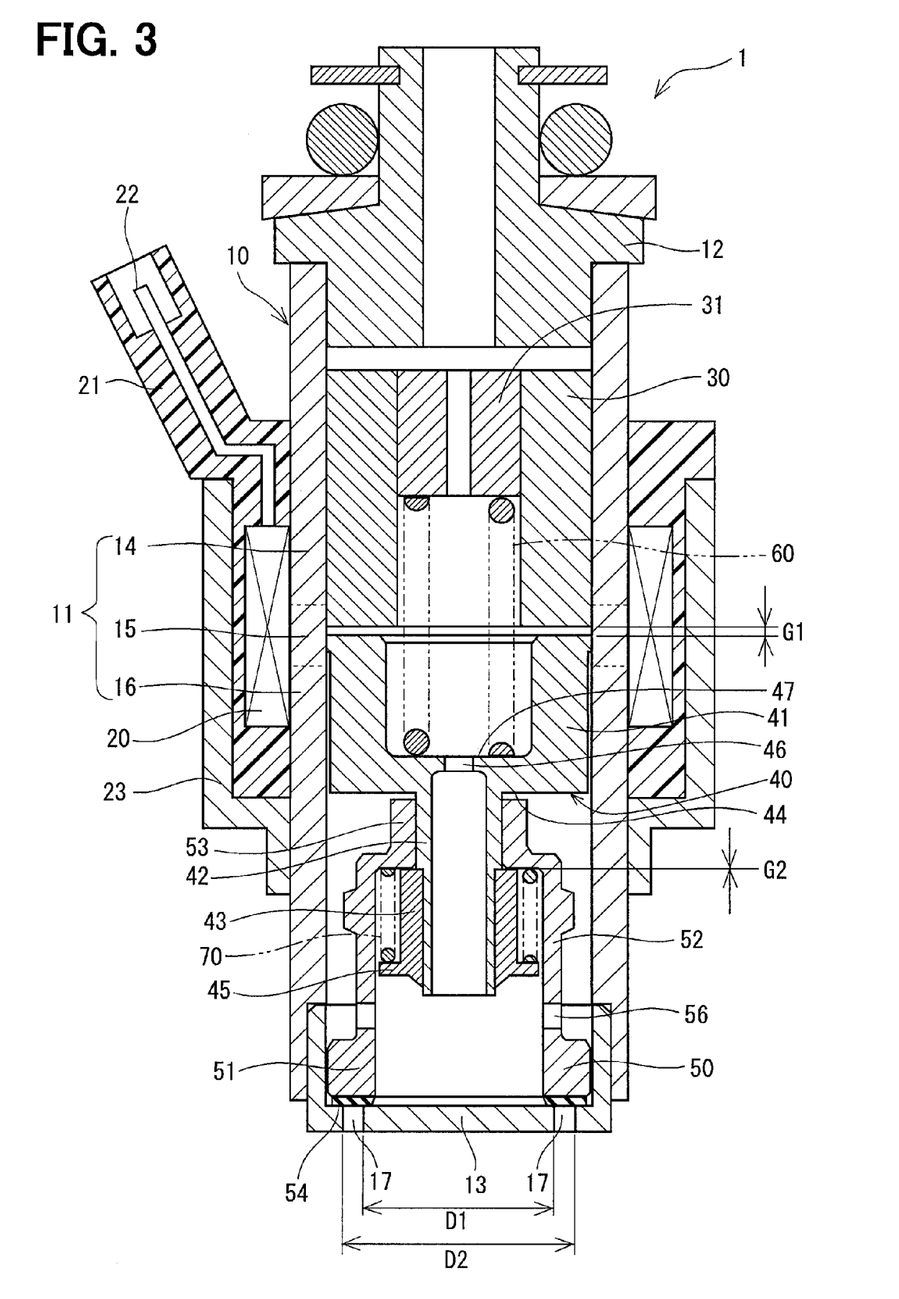
FIG. 3 is a sectional view of the fuel injection device according to the first embodiment of the present disclosure when a coil is energized.

When the coil 20 is energized by the terminal 22 of the connector 21, the coil 20 is excited. Accordingly, a magnetic flux flows in a magnetic circuit formed by the first magnetic portion 14, the stator 30, the movable element 40, the second magnetic portion 16, and the yoke 23, and a magnetic attraction force is generated between the stator 30 and the movable element 40. When the magnetic attraction force becomes larger than a sum of a pushing force of the first spring 60 and a pushing force of the second spring 70, the movable element 40 alone is magnetically attracted to the stator side. Consequently, as is shown in FIG. 3, the end face of the stopper portion 43 on the stator side and the lock portion 53 make contact with each other and the second gap G2 is reduced to 0. The first gap G1 in the state as above is of a size found by subtracting β from α. Hence, because the first gap G1 thus found is smaller than the first gap G1 of when the coil 20 is de-energized, a magnetic attraction force between the stator 30 and the movable element 40 increases. When the magnetic attraction force becomes larger than a force with which the main valve 50 is opened, the movable element 40 and the main valve 50 are magnetically attracted together to the stator side.

A force with which the main valve 50 is opened is a force found by adding a pushing force of the first spring 60 and a pushing force of the second spring 70 to the product of an opening sectional area of the injection hole 17 and an internal pressure of the housing 10.

Herein, let $D_1$ be an inner diameter of the injection hole 17, $D_2$ be an outer diameter of the injection hole 17, P be an internal pressure of the housing 10, $Sp_1$ be a pushing force of the first spring 60, and $Sp_2$ be a pushing force of the second spring 70. Then, a force F with which the main valve 50 is opened is expressed by Equation (1) as follows:

$$F=\{(D_2)^2\}\times\Pi\times P/4+Sp_1+Sp_2 \qquad (1).$$

Let N be a magnetic attraction force between the stator 30 and the movable element 40. Then, the movable element 40 and the main valve 50 are magnetically attracted to the stator side when N is larger than F.

Figure 4:
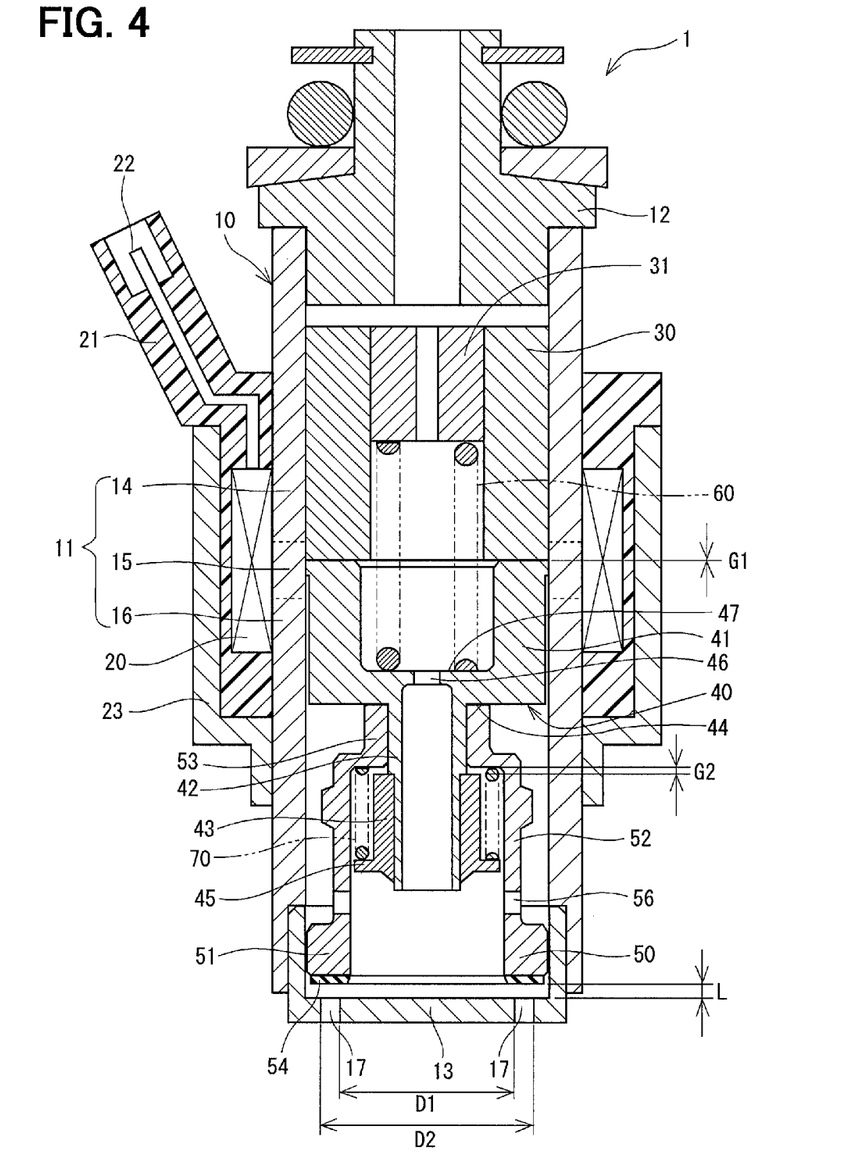
FIG. 4 is a sectional view of the fuel injection device according to the first embodiment of the present disclosure when a main valve is opened.

As is shown in FIG. 4, when the stator 30 and the movable element 40 are in contact with each other and the main valve 50 is away from the injection-hole member 13, fuel in the housing 10 passes near the end face of the main valve 50 on the injection hole side and is injected into the combustion chamber or the like of the internal combustion engine through the injection hole 17. Hence, when the main valve 50 is opened, a pressure acting on the main valve 50 is cancelled out. The main valve 50 thus moves further to the stator side due to the pushing force $Sp_2$ of the second spring 70. Accordingly, the step 44 of the movable element 40 and the end face of the lock portion 53 on the stator side make contact with each other and the second gap G2 as large as β is generated between the end face of the stopper portion 43 on the stator side and the lock portion 53. Consequently, a lift amount L between a sheet portion of the main valve 50 and the opening of the injection hole 17 becomes as large as α. In this case, the sheet portion of the main valve 50 is equivalent to the sheet member 54 of the valve main body portion 51.

An area $S_1$ of a flow channel through which the fuel flows to the injection hole 17 from both of the outer radius side and the inner radius side of the main valve 50 is expressed by Equation (2) below using a lift amount L of the main valve 50. In the present embodiment, the area $S_1$ of the flow channel is referred to as the sheet portion flow channel area $S_1$.

$$S_1=(D_1+D_2)\times L\times \Pi \qquad (2)$$

A sectional area $S_2$ of the injection hole 17 of the present embodiment is expressed by Equation (3) as follows:

$$S_2=\{(D_2)^2-(D_1)^2\}\times \pi/4 \qquad (3).$$

In the present embodiment, the sheet portion flow channel area $S_1$ is larger than the sectional area $S_2$ of the injection hole 17.

In short, the present embodiment has a relation that $S_1$ is larger than $S_2$.

In the present embedment, the sheet portion flow channel area $S_1$ is approximately 1.4 times larger than the sectional area $S_2$ of the injection hole 17.

When the energization of the coil 20 is stopped, a magnetic attraction force between the stator 30 and the movable element 40 vanishes and the movable element 40 and the main valve 50 are pushed to the injection hole side by the pushing force of the first spring 60. The sheet member 54 of the main valve 50 therefore closes the injection hole 17. Consequently, fuel injection from the injection hole 17 is stopped.

A relation of a magnetic attraction force N between the stator 30 and the movable element 40 and a size of the first gap G1 will now be described with reference to FIG. 5.

Figure 5:
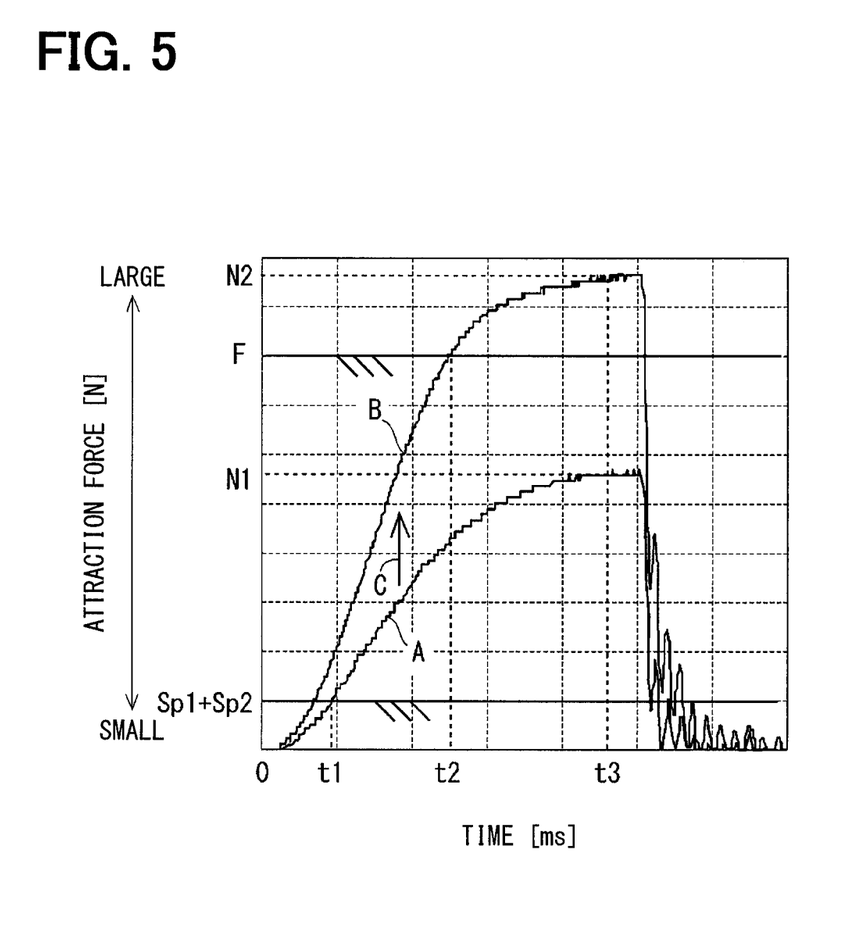
FIG. 5 shows a graph indicating a relation of a gap between a stator and a movable element and a magnetic attraction force.

In FIG. 5, a solid line A shows a variance of an attraction force since the energization of the coil 20 is started until the attraction force reaches a maximum value when the first gap G1 is α. Also, a solid line B shows a variance of an attraction force since the energization is started until the attraction force reaches a maximum value when the first gap G1 is γ. Herein, the test was conducted under the condition that the stator 30 and the movable element 40 were fixed. In the present embodiment, α is 300 μm and γ is found by subtracting β from α and found to be 100 μm.

Both of attraction forces indicated by the solid line A and the solid line B reach maximum values at a time t3 after an elapse of a predetermined time since the energization is started. A maximum value $N_1$ of the attraction force indicated by the solid line A is smaller than a maximum value $N_2$ of the attraction force indicated by the solid line B.

In the fuel injection device 1 of the first embodiment, the maximum value $N_1$ of the attraction force indicated by the solid line A is set to a value larger than a sum of the pushing force of the first spring 60 and the pushing force of the second spring 70 ($Sp_1+Sp_2$). Also, the maximum value $N_2$ of the attraction force indicated by the solid line B is set to a value larger than the force F with which the main valve 50 is opened.

Accordingly, when the energization of the coil 20 is started, the attraction force indicated by the solid line A becomes larger than a sum of the pushing force of the first spring 60 and the pushing force of the second spring 70 at and after a time t1. Hence, the movable element 40 alone moves to the stator side at and after the time t1. Thereafter, the first gap G1 becomes smaller and, as is indicated by an arrow C, the attraction force indicated by the solid line A changes to the attraction force indicated by the solid line B. The attraction force indicated by the solid line B becomes larger than the force F with which the main valve 50 is opened at and after a time t2. Hence, the movable element 40 and the main valve 50 move to the stator side at and after the time t2 and the injection hole 17 is opened.

Owing to the configuration as above, the fuel injection device 1 of the first embodiment is capable of increasing a lift amount L of the main valve 50 by increasing neither a physical size of the magnetic circuit formed by the coil 20, the stator 30, the movable element 40, and so on nor an amount of the energization of the coil 20.

The fuel injection device 1 of the first embodiment has functions and effects as follows. That is, (a) in the first embodiment, the second gap G2 between the stopper portion 43 provided to the movable element 40 and the lock portion 53 provided to the main valve 50 is smaller than the first gap G1 between the stator 30 and the movable element 40.

Hence, in the fuel injection device 1, the movable element 40 alone is magnetically attracted to the stator side when the movable element 40 is distant from the stator 30, that is, immediately after the energization is started, and the movable element 40 and the main valve 50 move together to the stator side when a magnetic attraction force increases while the movable element 40 comes closer to the stator 30. The fuel injection device 1 is thus capable of increasing the first gap G1 between the stator 30 and the movable element 40 when the energization is started. Consequently, in contrast to the fuel injection device described in Patent Literature 1, the fuel injection device 1 of the first embodiment is capable of increasing a lift amount L of the main valve 50 without causing an energy loss due to pilot injection or the like. In addition, because the fuel injection device 1 of the first embodiment does not perform pilot injection, the fuel injection device 1 is capable of increasing a fuel injection amount substantially linearly with an energization time.

(b) In the first embodiment, the main valve 50 has the valve main body portion 51 making contact with the opening of the injection hole 17 and the arm portion 52 extending from the valve main body portion 51 on the outer radius side of the stopper portion 43.

Hence, the outer diameter of the valve main body portion 51 can be increased. The main valve 50 is therefore suitable to a configuration in which the injection hole 17 is provided to the injection-hole member 13 at a radially outward position from the center.

(c) In the first embodiment, the movable element 40 has the movable element main body 41 making contact with the stator 30 and the shaft portion 42 extending from the movable element main body 41 on the inner radius side of the lock portion 53.

Hence, the outer diameter of the movable element main body 41 can be larger than the outer diameter of the shaft portion 42. Accordingly, the movable element main body 41 and the stator 30 come in contact with each other in a larger area. Consequently, a magnetic attraction force between the movable element main body 41 and the stator 30 can be increased.

(d) In the first embodiment, the first end of the second spring 70 is locked by the stopper portion 43 provided to the movable element 40 and the second end is locked by the lock portion 53 provided to the main valve 50.

Hence, contrary to the fuel injection device described in Patent Literature 1, the fuel injection device 1 of the first embodiment eliminates the need to provide the second spring 70 in a flow channel of fuel flowing inside the housing 10. The fuel injection device 1 is thus capable of preventing vibration-induced damage of the second spring 70.

Second Embodiment

Figure 6:
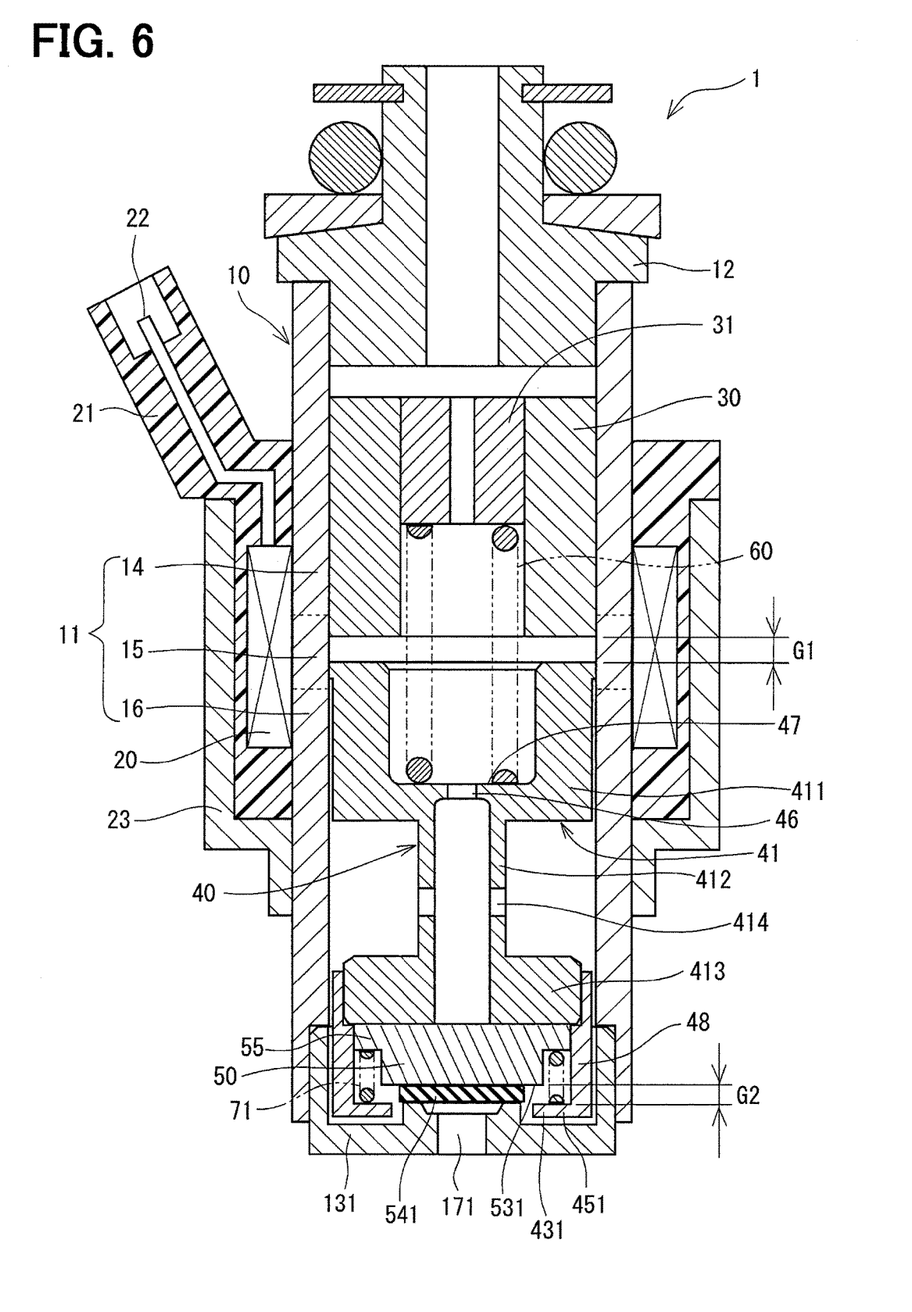
FIG. 6 is a sectional view of a fuel injection device according to a second embodiment of the present disclosure.
Figure 7:
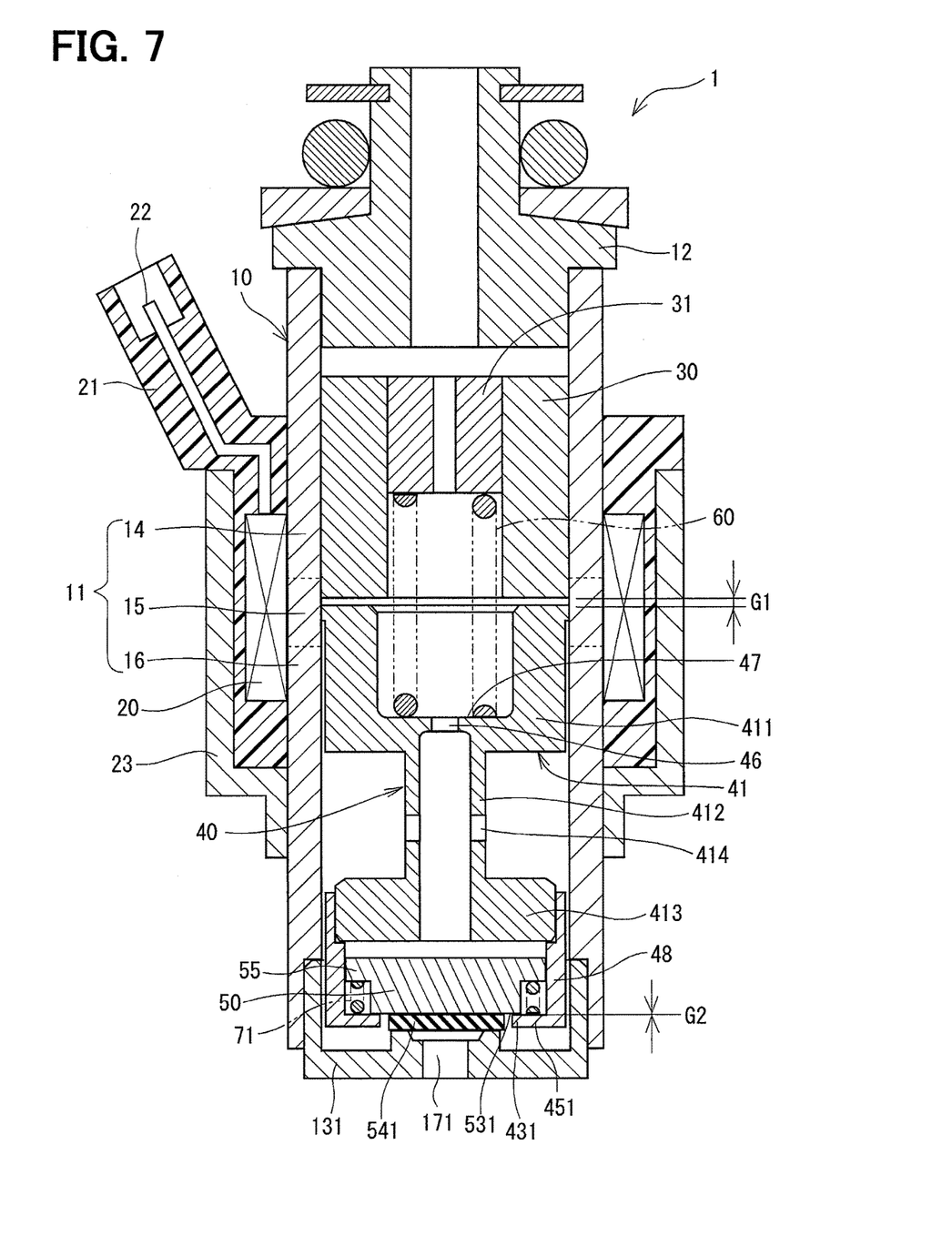
FIG. 7 is a sectional view of the fuel injection device according to the second embodiment of the present disclosure when a coil is energized.
Figure 8:
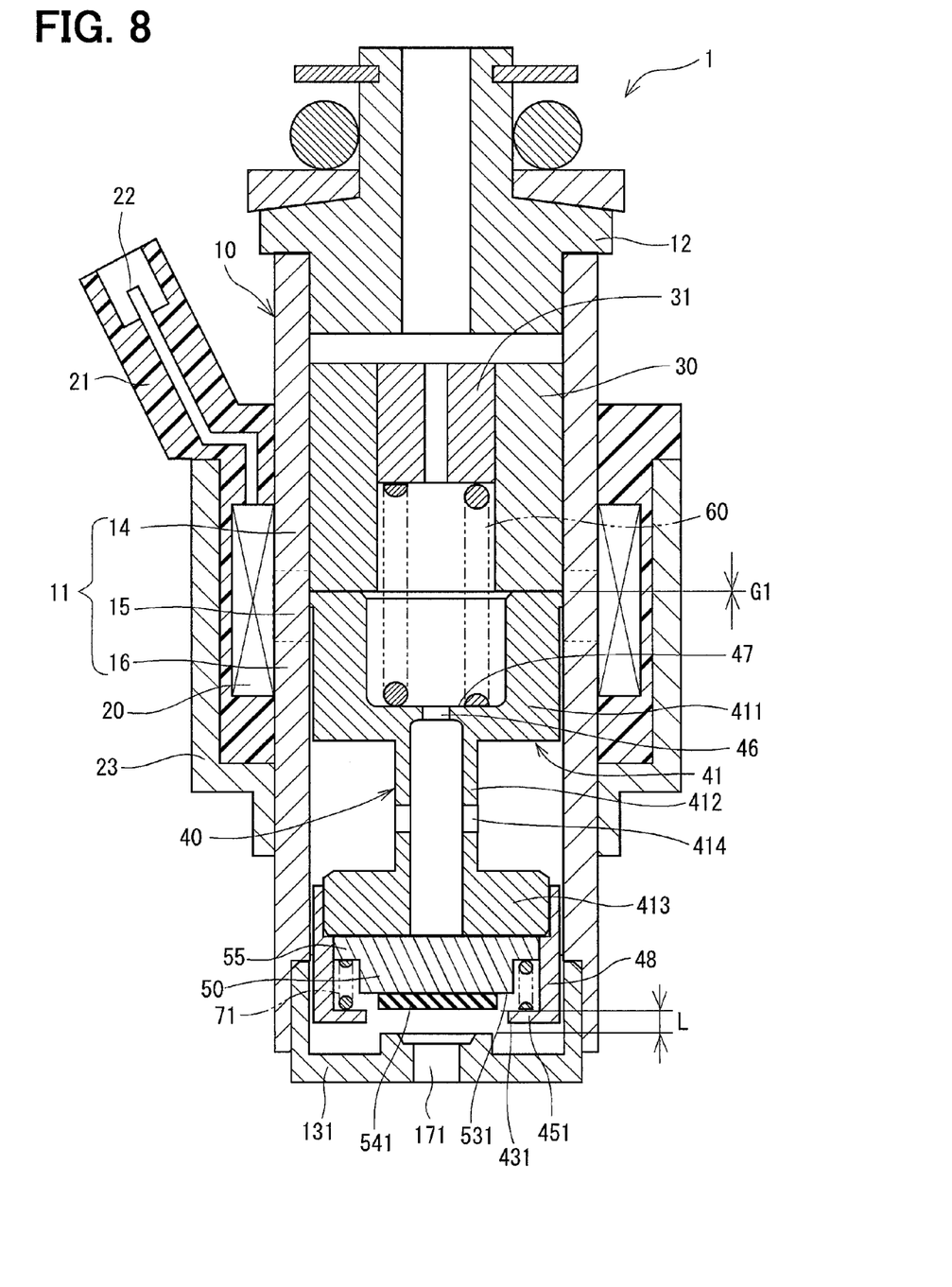
FIG. 8 is a sectional view of the fuel injection device according to the second embodiment of the present disclosure when the main valve is opened.

A second embodiment of the present disclosure is shown in FIG. 6 through FIG. 8. In the second embodiment, an injection hole 171 that is a cylindrical shape is provided at a center of an injection-hole member 131.

The movable element 40 has the movable element main body 41 allowed to make contact with the stator 30, a leg portion 48 extending from the movable element main body 41 to an injection hole side, and a stopper portion 431 connected to an inner radius side of the leg portion 48. A spring receiving portion 451 capable of supporting the second spring 70 is provided on an outer radius side of the stopper portion 431.

The movable element main body 41 includes a first movable element main body 411, a shaft portion 412, and a second movable element main body 413. The shaft portion 412 is provided with a hole 414 to let fuel pass through in a radial direction. Fuel flowing out to an outer radius side of the movable element main body 41 from the hole 414 is allowed to flow through a space between an outer wall of the leg portion 48 on an outer radius side and an inner wall of the housing 10.

The main valve 50 is provided on the inner radius side of the leg portion 48 in an axially reciprocable manner. The main valve 50 has a slide-contact portion 55 extending radially outward from the main valve 50 and coming into sliding contact with an inner wall of the leg portion 48. The main valve 50 and the movable element 40 are therefore disposed coaxially.

The main valve 50 has a sheet member 541 on the injection hole side. The sheet member 541 is allowed to make contact with an opening of the injection hole 171. Also, the main valve 50 has a lock portion 531 on an outer radius side of the sheet member 541. The lock portion 531 is allowed to make contact with the stopper portion 431.

A second spring 71 is provided between the stopper portion 431 and the leg portion 48. In the present embodiment, the second spring 71 is a second pushing portion. A first end of the second spring 71 is locked by the spring receiver portion 451 provided to the stopper portion 431 and a second end is locked by the slide-contact portion 55. The second spring 71 constantly pushes the main valve 50 to a stator side with respect to the stopper portion 431. Hence, a second gap G2 is generated between an end face of the stopper portion 431 on the stator side and the lock portion 531 when the coil 20 is de-energized. The second gap G2 is smaller than a first gap G1. Herein, let a be the first gap G1 and β be the second gap G2. In the state described as above, an end face of the main valve 50 on a movable element side and an end face of the movable element 40 on the injection-hole side are in contact with each other.

An operation of the fuel injection device 1 will now be described.

As is shown in FIG. 6, when the energization of the coil 20 is stopped, the movable element 40 is pushed to the injection hole side by a pushing force of the first spring 60 and because the main valve 50 is in contact with the end face of the movable element 40 on the injection-hole side, the main valve 50 is also pushed to the injection hole side. The main valve 50 therefore closes the injection hole 171 with the sheet member 541. Hence, fuel flowing into the housing 10 from the inlet member 12 is not injected from the injection hole 171.

When the coil 20 is energized by the terminal 22 of the connector 21, a magnetic attraction force is generated between the stator 30 and the movable element 40. When the magnetic attraction force becomes larger than a sum of a pushing force of the first spring 60 and a pushing force of the second spring 71, the movable element 40 alone is magnetically attracted to the stator side. Hence, as is shown in FIG. 7, the end face of the stopper portion 431 on the stator side and the lock portion 531 of the main valve 50 make contact with each other and the second gap G2 is reduced to 0. The first gap G1 in the state as above is of a size found by subtracting β from α. Hence, a magnetic attraction force between the stator 30 and the movable element 40 increases. When the magnetic attraction force becomes larger than a force with which the main valve 50 is opened, the movable element 40 and the main valve 50 are magnetically attracted together to the stator side.

As is shown in FIG. 8, when the stator 30 and the movable element 40 are in contact with each other and the main valve 50 is away from the injection-hole member 131, fuel in the housing 10 passes near the end face of the main valve 50 on the injection hole side and is injected through the injection hole 171. Hence, a pressure acting on a surface of the main valve 50 on the injection hole side and a pressure acting on a surface of the main valve 50 on the stator side are substantially balanced with each other. The main valve 50 moves further to the stator side when a sum of the pressure acting on the surface of the main valve 50 on the injection hole side and the pushing force of the second spring 71 becomes larger than the pressure acting on the surface of the main valve 50 on the stator side. Hence, the end face of the movable element 40 on the injection hole side and the end face of the main valve 50 on the movable element side make contact with each other. Consequently, a lift amount L between the sheet portion of the main valve 50 and the opening of the injection hole 171 becomes as large as α.

In the second embodiment, the movable element 40 has the movable element main body 41 making contact with the stator 30 and the leg portion 48 extending from the movable element main body 41 on the outer radius side of the lock portion 531. The main valve 50 is provided on the inner radius side of the leg portion 48.

Consequently, an outer diameter of the main valve 50 can be smaller. The main valve 50 is therefore suitable to a configuration in which the injection hole 171 is provided at a center of the injection-hole member 131.

Other Embodiments

The embodiments above have described the fuel injection device that injects gaseous fuel. Alternatively, a fuel injection device of other embodiments may be configured to inject liquid fuel.

In the embodiments described above, the second spring is provided between the spring receiving portion provided to the stopper portion and the lock portion. Alternatively, the second spring may be provided between a step of a movable core and an arm portion of a main valve or between an injection-hole member and an arm portion in other embodiments.

The present disclosure is not limited to the embodiments mentioned above, and can be applied to various embodiments which are also within the spirit and scope of the present disclosure.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

The invention claimed is:

1. A fuel injection device, comprising:
   a coil generating a magnetic field when energized;
   a stator provided on an inner side of the coil;
   a housing shaped like a cylinder and including an injection hole at an end opposite to a stator side in an axial direction;
   a movable element provided inside the housing in a reciprocable manner and including (i) a movable element main body, which defines a first gap with the stator, and (ii) a stopper portion at an injection hole side of the movable element main body;
   a main valve provided at the injection hole side of the movable element main body so as to open and close the injection hole, the main valve including a lock portion that, together with an end face of the stopper portion on the stator side, defines a second gap smaller than the first gap;
   a first pushing portion that is in direct contact with the movable element and constantly pushes the movable element to the injection hole side; and
   a second pushing portion constantly pushing the main valve to the stator side.

2. The fuel injection device according to claim 1, wherein:
   the main valve has a valve main body portion capable of opening and closing the injection hole, an arm portion extending from the valve main body portion on an outer radius side of the stopper portion, and the lock portion connected to the arm portion.

3. The fuel injection device according to claim 1, wherein:
   the movable element has a movable element main body allowed to make contact with the stator, a shaft portion extending from the movable element main body on an inner radius side of the lock portion, and the stopper portion connected to the shaft portion.

4. The fuel injection device according to claim 1, wherein:
   the movable element has a movable element main body allowed to make contact with the stator, a leg portion extending from the movable element main body on an outer radius side of the lock portion, and the stopper portion connected to the leg portion; and the main valve is provided on an inner radius side of the leg portion.

5. The fuel injection device according to claim 1, wherein:
the second pushing portion includes a first end that is locked by the movable element and a second end that is locked by the main valve.

\* \* \* \* \*